United States Patent
Obaidi et al.

(10) Patent No.: US 10,972,262 B2
(45) Date of Patent: Apr. 6, 2021

(54) PERSONA AND DEVICE BASED CERTIFICATE MANAGEMENT

(71) Applicant: T-Mobile USA, Inc., Bellevue, WA (US)

(72) Inventors: Ahmad Arash Obaidi, Tracy, CA (US); Eric W. Yocam, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/985,166

(22) Filed: Dec. 30, 2015

(65) Prior Publication Data
US 2017/0195124 A1 Jul. 6, 2017

(51) Int. Cl.
| | |
|---|---|
| *H04L 9/08* | (2006.01) |
| *H04L 9/32* | (2006.01) |
| *H04L 29/06* | (2006.01) |
| *H04L 9/30* | (2006.01) |
| *H04L 9/14* | (2006.01) |
| *H04W 12/041* | (2021.01) |
| *H04W 12/069* | (2021.01) |

(52) U.S. Cl.
CPC .............. *H04L 9/0861* (2013.01); *H04L 9/14* (2013.01); *H04L 9/30* (2013.01); *H04L 9/3226* (2013.01); *H04L 9/3263* (2013.01); *H04L 63/061* (2013.01); *H04L 63/0823* (2013.01); *H04L 63/0861* (2013.01); *H04W 12/041* (2021.01); *H04W 12/069* (2021.01)

(58) Field of Classification Search
USPC ........................................................ 713/156
See application file for complete search history.

(56) References Cited

U.S. PATENT DOCUMENTS

| | | | |
|---|---|---|---|
| 9,706,408 B2* | 7/2017 | Hawkes | ............... H04L 63/0823 |
| 2002/0029337 A1 | 3/2002 | Sudia et al. | |
| 2004/0139329 A1* | 7/2004 | Abdallah | ............... H04L 9/0894 |
| | | | 713/182 |
| 2006/0136748 A1 | 6/2006 | Bade et al. | |
| 2008/0022103 A1 | 1/2008 | Brown et al. | |
| 2008/0244706 A1 | 10/2008 | Lenoir et al. | |
| 2009/0150185 A1 | 6/2009 | Lassetter et al. | |
| 2011/0191837 A1* | 8/2011 | Guajardo Merchan | ...................... |
| | | | H04L 9/0866 |
| | | | 726/6 |

(Continued)

OTHER PUBLICATIONS

Chen, L., et al., Guidelines on Hardware-Rooted Security in Mobile Devices (Draft), National Institute of Standards and Technology, U.S. Department of Commerce, Oct. 2012, 33 pages.

*Primary Examiner* — Harris C Wang
(74) *Attorney, Agent, or Firm* — Knobbe, Martens, Olson & Bear, LLP

(57) ABSTRACT

A user device implements a certificate authority for issuing digital certificates that extend to other computing devices a level of trust to a particular user paired with the user device. The user device may obtain user persona information, generate a user key, and combine the user key with a device key for the generation of a digital certificate. The computing device may further transmit the digital certificate to a certificate management system, which manages interactions between other computing devices and the user device or authorizes operation of other computing devices by the particular user based on the digital certificate.

20 Claims, 5 Drawing Sheets

(56) References Cited

U.S. PATENT DOCUMENTS

| | | | |
|---|---|---|---|
| 2013/0166907 A1* | 6/2013 | Brown | H04L 9/3265 |
| | | | 713/156 |
| 2013/0339740 A1* | 12/2013 | Ben-Shalom | H04L 63/205 |
| | | | 713/175 |
| 2014/0136720 A1* | 5/2014 | Bonazzoli | H04L 63/0861 |
| | | | 709/229 |
| 2014/0181894 A1 | 6/2014 | Von Bokern et al. | |
| 2014/0282869 A1 | 9/2014 | Dabbiere | |
| 2014/0282916 A1 | 9/2014 | Gast | |
| 2014/0372762 A1 | 12/2014 | Flautner et al. | |
| 2015/0074764 A1* | 3/2015 | Stern | H04L 63/06 |
| | | | 726/4 |
| 2015/0121506 A1 | 4/2015 | Cavanaugh | |
| 2015/0236860 A1* | 8/2015 | Brown | H04L 9/32 |
| | | | 713/156 |
| 2015/0249540 A1 | 9/2015 | Khalil et al. | |
| 2015/0326543 A1* | 11/2015 | Pochuev | G06F 21/57 |
| | | | 713/155 |
| 2015/0341325 A1 | 11/2015 | Al Jabri | |
| 2016/0035215 A1* | 2/2016 | Obaidi | G08B 27/006 |
| | | | 340/286.02 |
| 2016/0142215 A1 | 5/2016 | Kruegel et al. | |
| 2016/0381003 A1* | 12/2016 | Caceres | H04L 63/0442 |
| | | | 713/156 |
| 2016/0381006 A1 | 12/2016 | Rykowski | |
| 2017/0195122 A1* | 7/2017 | Obaidi | H04L 9/321 |
| 2017/0195124 A1* | 7/2017 | Obaidi | H04W 12/0401 |

\* cited by examiner

PERSONA AND DEVICE BASED CERTIFICATE MANAGEMENT

BACKGROUND OF THE INVENTION

Mobile computing devices may be equipped with hardware-based root of trust (RoT) features. For example, Trusted Platform Module (TPM) is an international standard for a secure cryptoprocessor, which is a dedicated microprocessor designed to secure hardware by integrating cryptographic keys into devices. Since RoT features are often implemented in one or more dedicated hardware modules, RoT based authentication for access to keys, data, or systems is protected from various security attacks (e.g., guessing or automated dictionary attacks). Users and organizations may be motivated to extend some level of RoT enabled trust from one device to another.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

Figure 1:
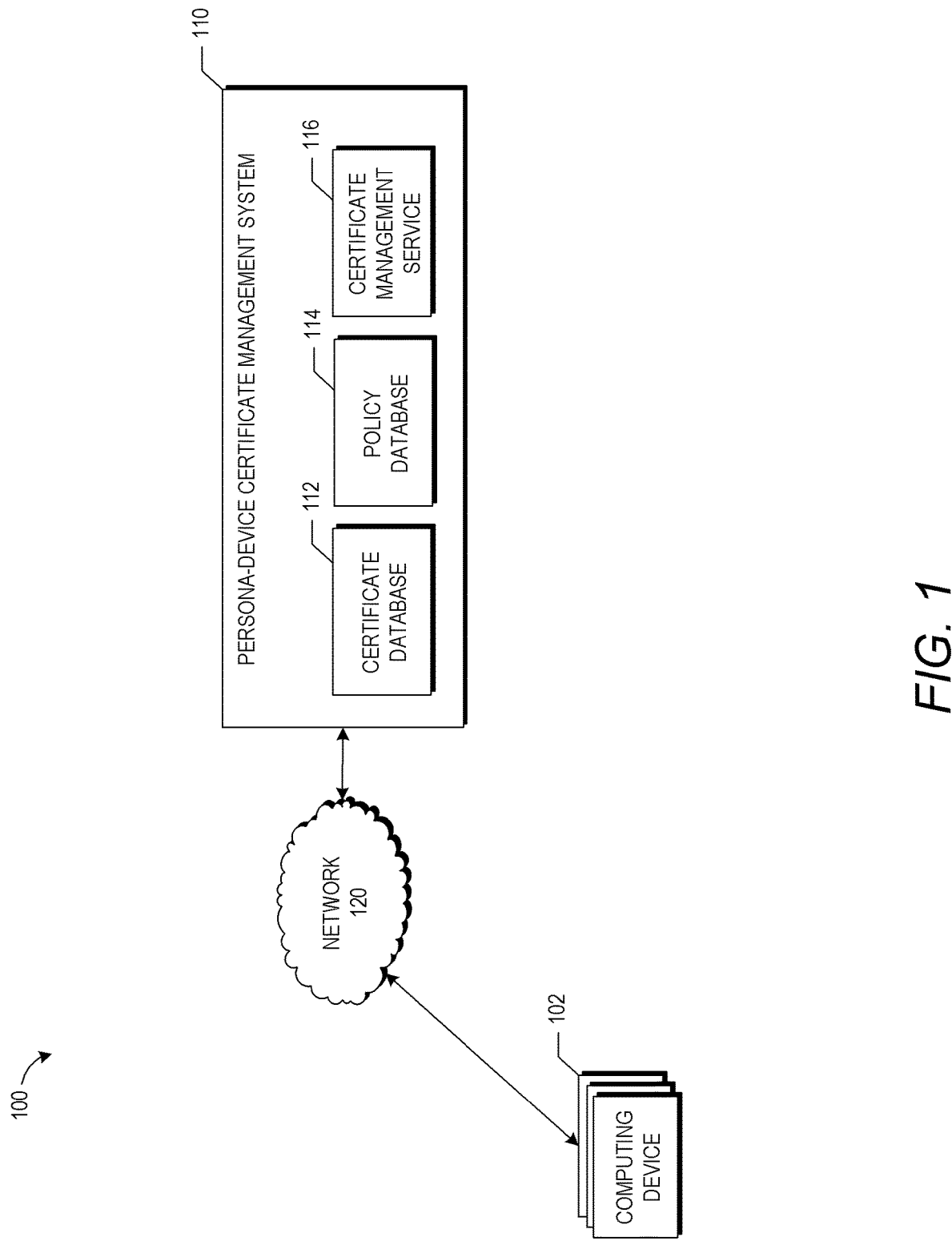
FIG. 1 illustrates an embodiment of a computing environment that includes an example persona-device certificate management system.

The present disclosure generally relates to the management of digital certificates for extending trusts among computing devices. More specifically, in one aspect, the present disclosure relates to the generation of digital certificates using RoT features on computing devices, which are capable of extending trusts among devices based on a combination of user personas and device identities. In another aspect, the present disclosure relates to the management of such digital certificates for the communication or other interactions among computing devices and users.

In accordance with an illustrative embodiment, a trusted persona application (e.g., an application with verified digital signatures associated with the application software) running on a user computing device (e.g., a smartphone) obtains persona information associated with a particular user's identity. For example, the persona application may capture the user's biometrics, such as fingerprint, palm print, iris scan, voice, typing pattern, gesture, or the like, during a device registration process, and generate a pair of public/private keys (generally referred to as a "persona key pair") based on the user persona information. The persona application may provide the private persona key of the persona key pair to a pairing component, which may be a part of lower level firmware (e.g. a bootloader) located on the user computing device. Upon receiving the private persona key, the pairing component requests and obtains a public device key associated with the user computing device's lowest level hardware. Illustratively, this public device key may be obtained via an interface, such as an application program interface (API), provided by a hardware security module that implements RoT features on the user computing device. The pairing component then combines the private persona key and the public device key, and provides the combination to a hardware certificate authority (e.g., another RoT feature) implemented on the device, as a basis for issuing digital certificate(s). The issued digital certificate may certify the particular user-device pairing (e.g., that the particular user is currently in control of the user computing device). Accordingly, the digital certificate may serve as a medium for extending a level of trust to the particular user-device pairing to other computing devices, systems, or services, and may facilitate secure or trusted interactions among computing devices and/or authorize use or operation of other computing devices/services by the particular user.

In accordance with an illustrative embodiment, the user computing device may transmit an issued digital certificate to a persona-device certificate management system. The persona-device certificate management system then confirms the validity of the digital certificate and determines how various computing devices under its management may interact with the user computing device. Alternatively or in addition, the persona-device certificate management system may authorize various computing devices under its management to be used or operated by the particular user. For example, in a corporate setting, the persona-device certificate management system may correspond to an active directory that maintains digital certificates associated with user-device pairings that are authorized to enter or stay on corporate campus. A security guard may locate various users/devices on campus based, for example, on the detection of wireless signals emitted by the devices. The security guard may then verify with the active directory whether a valid digital certificate exists for a particular user-device pairing. If the digital certificate does not exist or is no longer valid, the security guard may personally make further inquiries to the particular user. In this example, the digital certificate may need periodic renewal or reissue for proper enforcement of corporate campus security policies. As another example, a user approaching a car equipped with Internet of Things (IoT) technology may not need any physical keys to the car. As the user enters a certain proximity of the car, the car confirms with the persona-device certificate management system that a valid digital certificate associated with the user-device pairing exists. The car then unlocks itself and allows the user to enter and operate the car. In this case, the digital certificate may not need renewal or reissue until the user exists and/or attempts to re-enter the car.

FIG. 1 illustrates an embodiment of a computing environment 100 that includes an example persona-device certificate management system 110. In the environment 100, computing devices 102 can include, for example, desktop computers, laptop computers, tablets, personal digital assistants (PDAs), mobile phones, electronic book readers, other wireless handheld devices, set-top or other television boxes, media players, video game platforms, kiosks, other IoT devices, and/or the like. The computing devices 102 may or may not be associated with a respective user. In some embodiments, a computing device 102 may be associated with multiple users each having distinct persona information.

The computing devices 102 may communicate or otherwise interact with one another, and with the persona-device certificate management system 110 via a network 120, which can be a publicly accessible network of linked networks, possibly operated by various distinct parties, such as the Internet. In other embodiments, the network 120 may include a private network, personal area network ("PAN"), LAN, WAN, cable network, satellite network, any other medium of computer data transfer, or some combination thereof.

The persona-device certificate management system 110 can be implemented on one or more physical servers or other computing machines, each of which includes a hardware processor and a memory. In some embodiments, the person-device certificate management system 110 may be implemented on a computing device 102. Each of the components depicted in the persona-device certificate management system 110 can include hardware and/or software for performing various functionalities. In some implementations, the persona-device certificate management system 110 may include specialized hardware for performing one or more processes described herein. For example, in some cases, a certificate management service 116 may be implemented using specialized hardware dedicated to interfacing with computing devices under its management, certificate validation and maintenance, certificate based policy retrieval and updating, etc. In some embodiments, the persona-device certificate management system 110 may include one or more physical servers for receiving, processing, and responding to requests from computing devices 102. Such servers can include Web servers, application servers, database servers, and/or other types of servers, and can be geographically co-located or geographically dispersed.

The persona-device certificate management system 110 may further include a certificate database 112 and a policy database 114. The certificate database 112 may include relational tables and datasets that store or otherwise maintain various digital certificates associated with respective user-device pairings. The digital certificates may be provided by user computing devices that attempt to interact with any computing devices under management of the persona-device certificate management system 110. Alternatively or in addition, the digital certificates may be provided by user computing devices upon request from the persona-device certificate management system (e.g., as part of a registration process for particular user-device pairings). Each digital certificate maintained by the persona-device certificate management system 110 may be associated with metadata for indicating one or more statuses, characteristics, policies, or the like, that are applicable to the corresponding user-device pairing.

The policy database 114 may include relational tables and datasets that store or otherwise maintain policies or rules applicable to the digital certificates. The policies or rules may specify or indicate procedures, criteria, thresholds, constraints, or the like, for individual or groups of computing devices under management of the persona-device certificate management system to interact with user-device pairings associated with particular digital certificates. As described above, the policies or rules may be linked to each digital certificate maintained by the certificate database 112 through associated metadata. In some embodiments, the policies or rules may form one or more hierarchical structures, where more general or common policies are located higher in the structure and more specific or individualized policies located lower.

It should be noted that functionalities of the various components of the persona-device certificate management system 110 can be distributed across multiple machines, networks, and other computing resources. The various components of the persona-device certificate management system 110 can also be implemented on one or more virtual machines, rather than on dedicated servers. Likewise, the data repositories shown can represent physical and/or logical data storage, including, for example, storage area networks or other distributed storage systems. Moreover, in some embodiments, the connections between the components shown represent possible paths of data flow, rather than actual connections between hardware. While some examples of possible connections are shown, any of the subset of the components shown can communicate with any other subset of components in various implementations.

Figure 2:
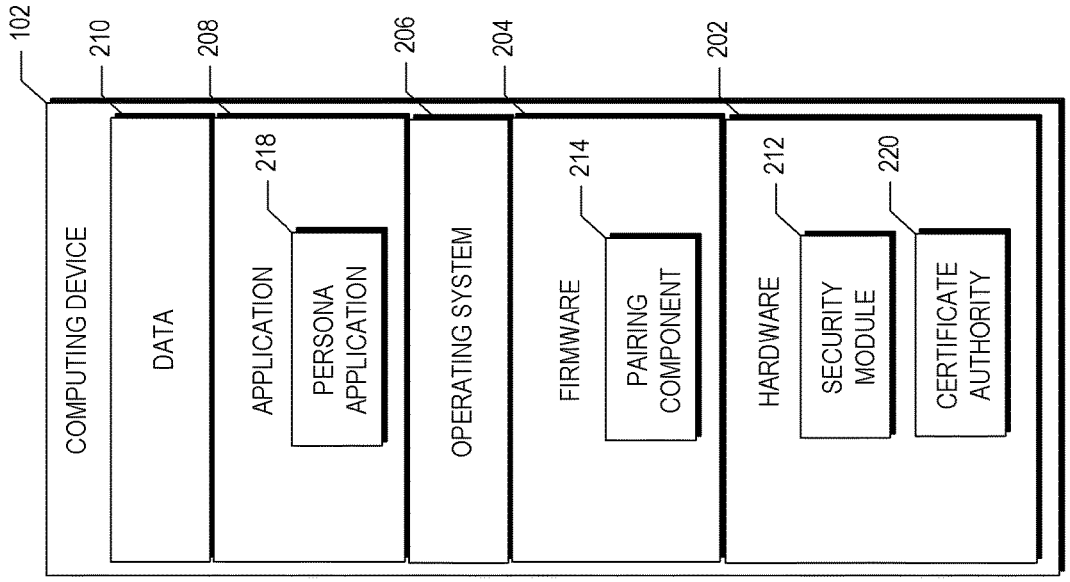
FIG. 2 illustrates an embodiment of a computing device capable of implementing a persona-device certificate generation process.

FIG. 2 illustrates an embodiment of a computing device 102 capable of implementing a persona-device certificate generation process. As illustrated in FIG. 2, the computing device 102 may include a stack having a hardware level 202, firmware level 204, operating system level 206, application level 208, and data level 210. Generally, each level of the stack provides services and interfaces for the higher levels of the stack to use. Higher levels of the stack typically must trust lower levels of the stack to be trustworthy, as they often have limited insight into what occurs at those lower levels.

The hardware level 202 is the lowest level of the stack that includes hardware components. The hardware level may provide support for multiple data connectivity methods including 3GPP and 3GPP2 cellular, IEEE 802.11 wireless local area networks (WLANs), Bluetooth, near field communication (NFC), or the like. The hardware level may also include rich media player capabilities, cameras, GPS receivers, and various sensors (e.g., accelerometer, gyroscope, proximity, compass, or the like) or biometric readers (e.g., fingerprint reader, iris scanner, microphones, thermometer, or the like). Components within the hardware level may be provided by chipset and device manufacturers. In particular, the hardware level may include a security module 212 that serves as the basis from which to build and extend trust to higher levels of the stack (e.g., implementing or enabling RoT features). Illustratively, the security module 212 may include a separate chip that acts as some of the RoTs to store and sign assertions, as well as a key used to root confidentiality guarantees made by other RoTs. The security module 212 may provide an interface (e.g., an API) though which public device key(s) associated with the device's lowest level hardware may be requested from higher level(s).

Further, the hardware level 202 may include a certificate authority 220, which may correspond to another security module. As discussed above, the certificate authority 220 may issue electronic documents for verifying a digital entity's identity. The electronic documents, i.e., digital certificates, can be an essential part of secure communication and may play an important part in the public key infrastructure (PKI). Digital certificates may specify the owner entity's identifying information, the expiration date, time, or condition, the context for using the certificate, and/or other associated metadata. In some embodiments, the context for using the certificate may include ways to communicate with the owner entity (e.g., public key(s) for establishing communication channels). As part of the certificate issuing process, the certificate authority 220 may generate a digital signature (e.g., using one of the certificate authority's own private keys) over the information included in the digital certificate, and incorporate the digital signature into the digital certificate. The digital signature can be verified by a receiving party to confirm the authenticity of the digital certificate, for example, based on a corresponding public key of the certificate authority that has been made available to the receiving party. The digital certificate thus serves as a confirmation or validation by the certificate authority that the information contained in the certificate belongs to the owner entity noted in the certificate.

The firmware level 204 may correspond to a protected set of special code that interacts closely with computing device hardware. For example, the firmware level may include boot firmware that initializes hardware components and loads an operating system, as well as other firmware components that control other hardware components, such as the baseband processor and radios. In some embodiments, the firmware level may contain some of the RoTs. Firmware may have controlled mutability (as opposed to hardware with inherent immutability), with any changes being produced by the manufacturer and verified and authorized by the communication service provider before they are deployed. Firmware may also be responsible for setting up the configuration of the hardware of the device and measuring and launching itself, any other ROM code that runs before the operating system, and the boot record which in turn launches the main operating system.

The firmware level may include a trusted pairing component 214, which may interact with the security module 212 and components of higher levels for obtaining information for the generation of digital certificate(s). The pairing component 214 may also interact with the certificate authority 220 for issuance of digital certificate(s). In some embodiments, the pairing component 214 may reside in another level (e.g., the hardware or application level) of the stack.

The operating system level 206 may include the operating system kernel and system service components along with their configuration data. The operating system kernel may provide application isolation. Various components of the operating system level may set up application environments, provide interfaces to access the device hardware, manage and enforce information policies, and offer various other services.

Software applications execute in the application level 208. As described above, the operating system kernel may provide isolation among applications. The isolation mechanisms used to enforce this separation may prevent applications from modifying or tampering with code, configuration data, or user data tied to other applications. A persona application 218 may reside in the application level 208. The persona application 218 may be a trusted application capable of obtaining persona information (e.g., registering fingerprints, palm prints, iris scans, voices, facial images, typing patterns, moving patterns, gestures, temperature, heartrates, other biometric features, as well as passwords, passcodes, or other non-biometric authenticating information for a particular user). The persona application 218 may utilize various hardware components to obtain persona information and generate persona key pairs based on particular pieces or combination of persona information (e.g., a fingerprint and the voice of a particular user). In some embodiments, the persona application 218 may authenticate or verify the identity of the user at a later time by re-capturing user persona information and comparing with previously obtained information. After authentication of the user identity, the private persona key previously generated may be unlocked for use.

The data level 210 may include data that are processed by applications. Security capabilities provided by applications, operating system components, or software/firmware components rooted in hardware may protect this data, maintain separation, and ensure that only authorized applications have access to each piece of data. It should be noted that the stack for a computing device 102 may include different, fewer, or more levels of architecture, and individual levels may be classified or implemented differently than discussed above with respect to FIG. 2.

Figure 3:
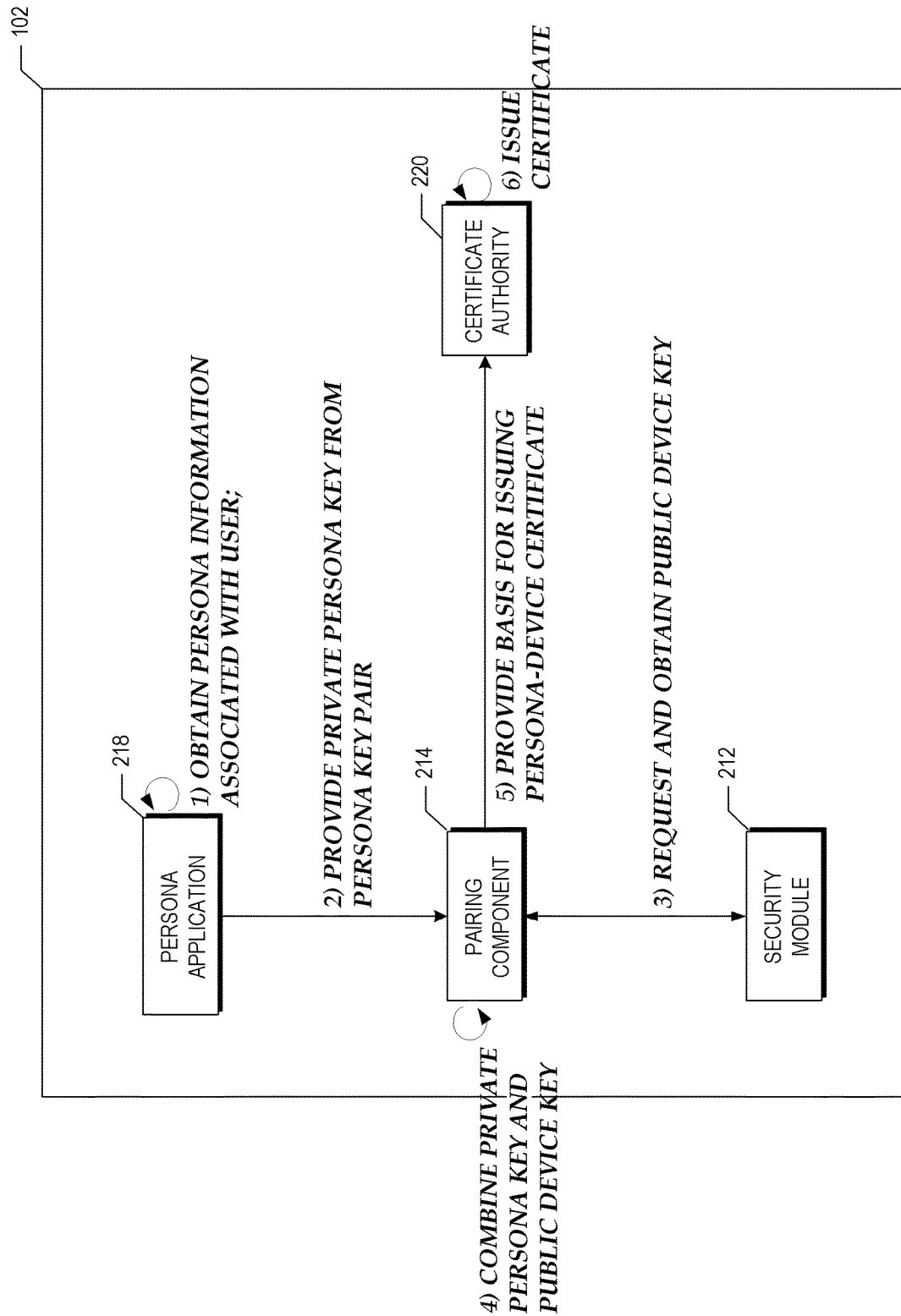
FIG. 3 illustrates example interactions among components of the computing device for the generation of a persona-device certificate.

FIG. 3 illustrates example interactions among components of the computing device 102 for the generation of a persona-device certificate. At (1), the persona application 218 obtains persona information associated with a particular user's identity. In some embodiments, the persona application may capture the user's distinct persona information and generate a persona key pair based thereon. If the persona key pair generation is performed during a user registration process, the public persona key of the persona key pair may be provided to another computing module, device, system, or service for user registration, and the private persona key of the persona key pair may be locked.

In some embodiments, the persona application may authenticate a user by capturing the user's current persona information and comparing with previously obtained user persona information (e.g., persona information provided during user registration). If the current persona information matches the previously obtained person information, the persona application may unlock a corresponding private person key that was previously generated for use in the generation of the persona-device certificate.

At (2), the persona application 218 provides the private persona key from the persona key pair to the pairing component 214. Upon receiving the private persona key, at (3), the pairing component 214 requests and obtains from the security module 212 a public device key associated with the computing device 102's lowest level hardware. Illustratively, this public device key may be obtained via an API call made from the pairing component to the security module. In some embodiments, the API call may include the private persona key as an argument or parameter, and the public device key may be generated or determined by the security module 212 based on the private persona key.

At (4), the pairing component 214 combines the private persona key and the public device key. The combination of the two keys uniquely identifies a distinct user-device pairing. For example, the pairing component may generate a two-dimensional vector with both keys (or their respective mathematical variants) as components. As another example, the two keys may be input into a function f (private persona key, public device key), which outputs a value or identifier that is unique for each distinct (private persona key, public device key) pair. For the embodiments where the API call included the private persona key as an argument or parameter, the public device key returned from the call may be considered a combination of the two keys.

At (5), the pairing component 214 provides the key combination to the certificate authority 220 as a basis for issuing a digital certificate. In some embodiments, the digital certificate may include the key combination as a unique identifier for the user-device pairing. In other embodiments, the certificate authority maps the key combination to another persona-device identifier based on hardware implemented one-on-one mapping, and includes the persona-device identifier in the digital certificate. The digital certificate may include additional identifying information regarding the user or the device, expiration time or condition, context for use, or other associated metadata. In some embodiments, the pairing component 214 may provide to the certificate authority 220 a signature generated based on the private persona key for inclusion in the digital certificate. Accordingly, a receiving party processing or having access to the corresponding public person key may further confirm the user's identity by verifying the signature.

At (6), the certificate authority 220 issues the digital certificate. As discussed above, the certificate authority 220 may sign the digital certificate using one of its own private keys and issue the certificate. In some embodiments, the computing device 102 stores the issued digital certificate and transmits it to other computing devices, systems, or services to extend a level of trust to the user-device pairing. For example, an initially issued certificate for a particular user-device pairing may be transmitted to the persona-device certificate management system 110 for registration of the user-device pairing. Subsequently issued certificates (i.e., renewed or reissued certificate) for the same user-device pairing may be transmitted in accordance with various use contexts to maintain the extended trust to the user-device pairing.

Figure 4:
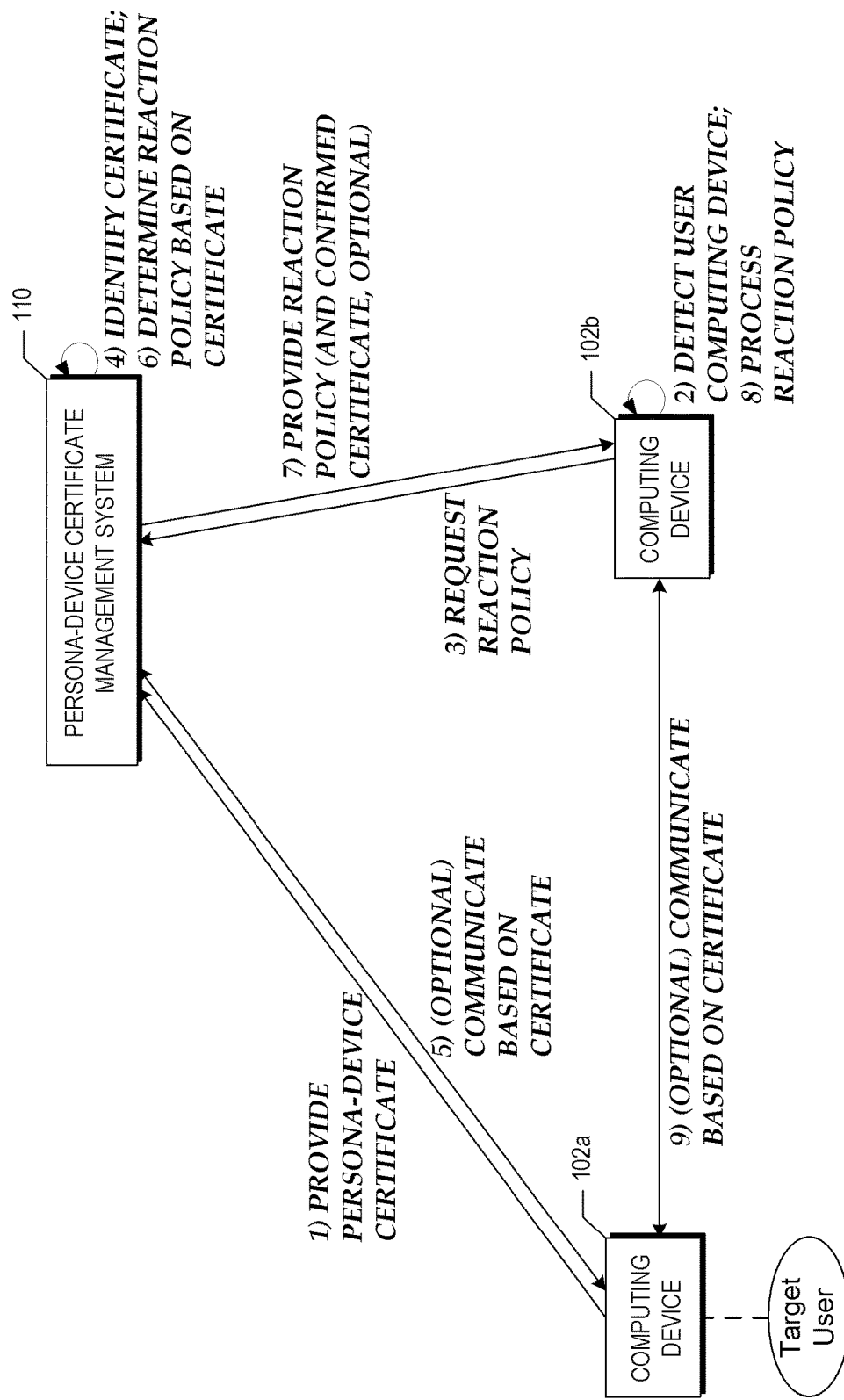
FIG. 4 illustrates example interactions among components of the computing environment of FIG. 1 with respect to a persona-device certificate.

FIG. 4 illustrates example interactions among components of the computing environment 100 of FIG. 1 with respect to a person-device certificate. At (1), a computing device 102a transmits an issued digital certificate to the persona-device certificate management system 110. As discussed above, the issued digital certificate certifies a particular user-device pairing corresponding to the computing device 102a that is currently under control of or is otherwise associated with a target user. In some embodiments, the computing device 102a may transmit the digital certificate to register the particular user-device pairing with the persona-device certificate management system 110. In some embodiments, the computing device 102a may transmit a currently issued (e.g., renewed or reissued) digital certificate for the same user-device pairing at a time when the computing device 102a or its associated target user attempts to interact with any computing device 102b managed by the persona-device certificate management system 110. In other embodiments, the computing device 102a may transmit a currently issued digital certificate upon request from the persona-device certificate management system 110. The persona-device certificate management system 110 may store the received digital certificate or update a previously received corresponding certificate in an associated database (e.g., the certificate database 112). Additionally, the persona-device certificate management system 110 may determine, modify, or update any status, characteristics, policies, or rules that are linked to the digital certificate.

At (2), the computing device 102b detects the user computing device 102a and obtains one or more identifiers (e.g., device MAC address, SSID, IP address, or the like) that identify the device 102a. This can be achieved by the computing device 102b using various device locating or detection technologies (e.g., geo-fencing) based on GPS, cellular, or other wireless signals. In some embodiments, the computing device 102b may also receive a currently issued digital certificate from the user computing device 102a. At (3), the computing device 102b requests a reaction policy with respect to the detected computing device 102a from the persona-device certificate management system 110. The reaction policy request may indicate the one or more identifiers that identify device 102a, and in some embodiments, the request may include the currently issued digital certificate.

At (4), the persona-device certificate management system 110 identifies from an associated database (e.g., the certificate database 112) a digital certificate that matches information included in the computing device 102b's reaction policy request and confirms the digital certificate's authenticity and/or validity. It should be noted that the identified digital certificate may or may not be a most current digital certificate issued by the user computing device 102a. For example, the identified digital certificate may have already expired based on a time or condition indicated in the certificate. In this situation, the persona-device certificate management system 110 may request and obtain a new certificate from the computing device 102a. At (5), the persona-device certificate management system 110 may optionally communicate with the computing device 102a based on the identified or newly obtained digital certificate. For example, the communication may further confirm the identity of the device 102a (or its associated target user), or negotiate various protocols, contexts or constraints applicable to interactions between the devices 102a (or its associated target user) and 102b.

At (6), the persona-device certificate management system 110 determines reaction policies applicable to the interaction between devices 102a and 102b. This may be achieved by looking up rules or policies in an associated database (e.g., the policy database 114) that are linked to the digital certificate. Alternatively or in addition, the persona-device certificate management system may authorize the computing device 102b to be used or operated by the target user based on applicable reaction policies. At (7), the persona-device certificate management system 110 provides the reaction policies to the computing device 102b. In some embodiments, the persona-device certificate management system 110 also provides the digital certificate to the device 102b.

At (8), the computing device 102b processes the reaction policies. For example, the reaction policies may specify a threshold proximity for reaction, i.e., when the user computing device 102a enters the threshold proximity of computing device 102b, the computing device 102b may react to the user device 102a. As another example, the reaction policies may require the computing device 102b to re-confirm the digital certificate or reaction policy with the persona-device certificate management system 110 at predetermined intervals or based on triggering events. As still another example, the reaction policies may instruct the computing device 102b to interact with the user computing device 102a in accordance with certain protocols or constraints. As a further example, the reaction policies may authorize particular or limited functionalities of the computing device 102b for use or operation by the target user. At (9), the computing device 102b optionally communicates with the user computing device 102a to further confirm the identity of the device 102a (or its associated target user), or to establish various protocols, contexts or constraints applicable to interactions between the devices 102a (or its associated target user) and 102b.

Figure 5:
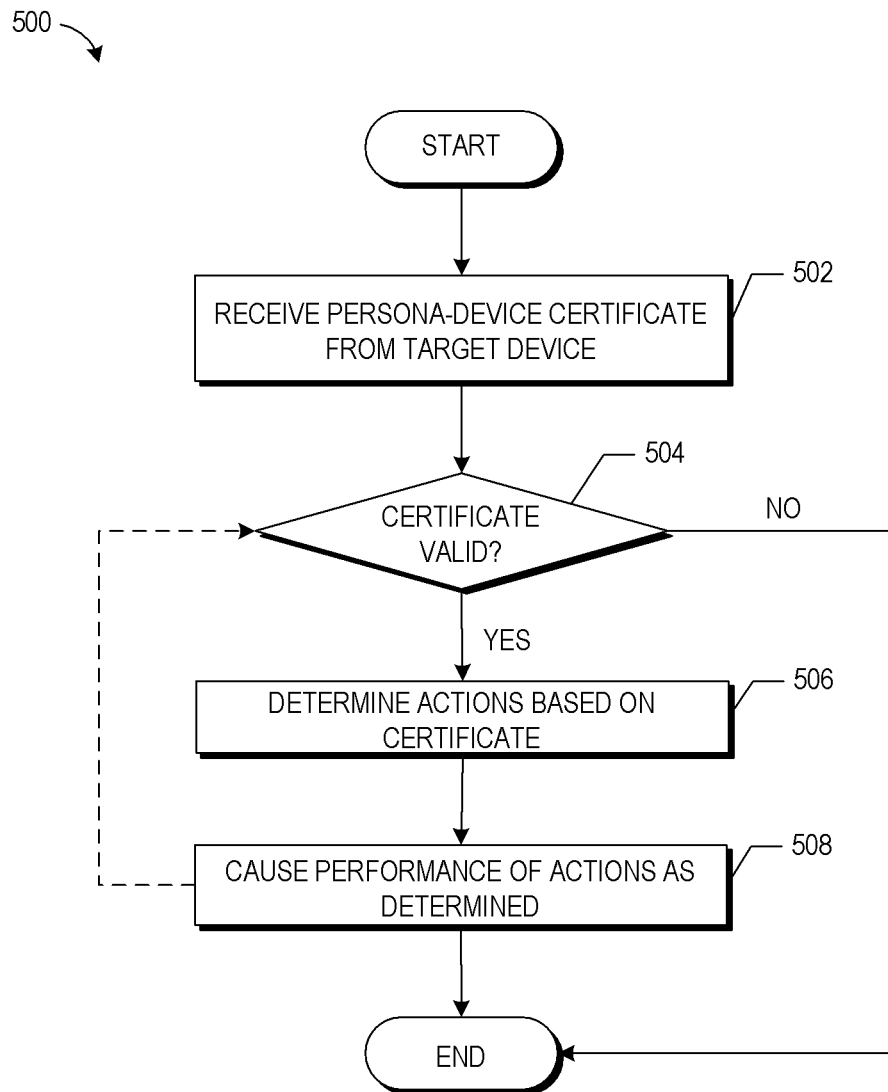
FIG. 5 illustrates a persona-device certificate management routine implemented by an example persona-device certificate management system.

FIG. 5 illustrates a persona-device certificate management routine 500 implemented by an example persona-device certificate management system 110. At block 502, the persona-device certificate management system 110 receives a persona-device certificate from a target computing device 102. As discussed above, the persona-device certificate may be issued by a certificate authority and certifies that the target device 102 is currently under control of, used by, or otherwise associated with a target user. In some embodiments, the persona-device certificate management system 110 registers the persona-device certificate and its corresponding user-device pairing for services or authorizations that are under management of the persona-device certificate management system 110, and associates applicable policies or rules with the persona-device certificate. For example, in a corporate setting, the persona-device certificate management system 110 may correspond to an active directory that maintains certificates associated with user-device pairings that are authorized to enter or stay on corporate campus. As another example, in an automobile operation context, the persona-device certificate management system 110 may associate the persona-device certificate with an authorization to enter and operate a target car equipped with IoT technology.

In some embodiments, the persona-device certificate is received prior to or concurrently with the target device's attempt to interact with any computing device managed by the persona-device certificate management system 110. For example, in the corporate setting described above, the persona-device certificate may be received from the target device when the target device enters the perimeter of corporate campus. As another example, in the automobile operations context as described above, the persona-device certificate may be received when the target device enters a threshold proximity of the target car.

As described above, the persona-device certificate management system 110 may store the received certificate or update a previously received corresponding certificate in an associated database (e.g., the certificate database 112). Additionally, the persona-device certificate management system 110 may determine, modify, or update any status, characteristics, policies, or rules that are linked to the certificate.

At block 504, the persona-device certificate management system 110 verifies the validity of the persona-device certificate. In some embodiments, the verification may be triggered by a request from one or more computing devices under management of the persona-device certificate management system 110. As discussed above, a computing device under management of the persona-device certificate management system 110 may detect the target device and obtain one or more identifiers (e.g., device MAC address, SSID, IP address, or the like) that identify the target device. In some embodiments, the computing device under management of the persona-device certificate management system 110 may receive a persona-device certificate from the target device. The computing device under management of the persona-device certificate management system 110 may then request a reaction policy with respect to the detected target device from the persona-device certificate management system 110.

The persona-device certificate management system 110 may verify one or more signatures using public key(s) associated with the issuing certificate authority, target device, or target user. As another example, the persona-device certificate management system 110 may determine whether the persona-device certificate as expired based on a time or condition indicated in the certificate. If the certificate has expired, the persona-device certificate management system 110 may request and obtain a new (e.g., renewed or reissued) certificate from the target device. In some embodiments, the persona-device certificate management system 110 may communicate with the target device based on the persona-device certificate (e.g., using one or more public keys indicated in the certificate) to further confirm the identity of the target device and/or its associated target user.

If the persona-device certificate management system 110 determines that the certificate is invalid, the routine of FIG. 5 terminates. If the persona-device certificate management system 110 determines that the certificate is valid, the routine proceeds to block 506.

At block 506, the persona-device certificate management system 110 determines which actions the system or any computing device under its management may perform, based on the persona-device certificate. As discussed above, the persona-device certificate management system 110 may look up rules or policies in an associated database (e.g., the policy database 114) that are linked to the persona-device certificate. The persona-device certificate management system 110 may further modify or refine the rules or policies based on the context of use (e.g., location of target device, proximity to one or more computing devices under management of the persona-device certificate management system 110, capacity or condition of the target device or the one or more computing devices under management of the persona-device certificate management system 110, or the like).

At block 508, the persona-device certificate management system 110 causes performance of the actions as determined. Illustratively, the persona-device certificate management system 110 provides the reaction policies to one or more computing devices under its management. In some embodiments, the persona-device certificate management system 110 also provides the digital certificate to the one or more computing devices under its management. Alternatively or in addition, the persona-device certificate management system 110 may authorize the one or more computing devices under its management to be used or operated by the target user based on applicable reaction policies. In some embodiments, the actions include additional validation(s) of the persona-device certificate that are periodic or event-triggered. For example, upon expiration of the current certificate, renewal or reissue of the certificate may be needed in order for the persona-device certificate management system 110 to authorize continued use or interaction with certain computing devices under its management. In these embodiments, the routine of FIG. 500 proceeds to block 504. Otherwise, the routine ends.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer implemented digital certification system comprising:
    a mobile computing device comprising a firmware component and a hardware certificate authority;
    the firmware component configured to:
        obtain a private persona key associated with a user of the mobile computing device; and
        obtain a public device key associated with the mobile computing device;
    a hardware security module of the mobile computing device configured to provide the public device key to the firmware component; and
    the hardware certificate authority configured to:
        receive, from the firmware component, a persona-device identifier associated with a pairing of the user and the mobile computing device, wherein the persona-device identifier is generated based, at least in part, on the private persona key and the public device key; and
        generate a digital certificate certifying that the mobile computing device is under control of the user.

2. The computer implemented digital certification system of claim 1, wherein the firmware component corresponds to a bootloader.

3. The computer implemented digital certification system of claim 1, wherein the firmware component is further configured to obtain the private persona key from a software persona application running on the mobile computing device.

4. The computer implemented digital certification system of claim 3, wherein the persona application corresponds to trusted software installed on the mobile computing device.

5. The computer implemented digital certification system of claim 3, wherein the persona application generates a persona key pair including the private persona key and a corresponding public persona key, based at least partly on persona information associated with the user.

6. The computer implemented digital certification system of claim 5, wherein the persona information includes at least one of a fingerprint, palm print, iris scan, voice, facial image, typing pattern, moving pattern, gesture, temperature, heart-rate, password, or passcode.

7. The computer implemented digital certification system of claim 1, wherein a combination of the private persona key and the public device key uniquely identifies the pairing of the user and the mobile computing device.

8. The computer implemented digital certification system of claim 1, wherein the persona-device identifier is generated by the firmware component.

9. The computer implemented digital certification system of claim 1, wherein the persona-device identifier is generated based on a mathematical function of the private persona key and the public device key.

10. The computer implemented digital certification system of claim 1, wherein the persona-device identifier is generated by the hardware security module in response to a request from the firmware component.

11. A computer implemented method for generating a digital certificate, the method comprising:
as implemented by a mobile computing device configured with specific executable instructions, the mobile computing device comprising a firmware component and a hardware certificate authority,
obtaining, by the firmware component, a private persona key based on persona information associated with a user of the mobile computing device;
obtaining, by the firmware component, a public device key associated with the hardware of the mobile computing device, wherein the public device key is provided to the firmware component by a hardware security module of the mobile computing device;
receiving, by the hardware certificate authority from the firmware component, a persona-device identifier associated with a pairing of the user and the mobile computing device, wherein the persona-device identifier is generated based, at least in part, on the private persona key and the public device key; and
causing, by the hardware certificate authority, generation of a digital certificate certifying that the mobile computing device is under control of the user.

12. The computer implemented method of claim 11 further comprising combining the private persona key and the public device key.

13. The computer implemented method of claim 12, wherein combining the private persona key and the public device key comprises making an API call to request the device key in response to receipt of the persona key.

14. The computer implemented method of claim 11, wherein the hardware certificate authority signs the digital certificate using a key associated with the hardware certificate authority.

15. Non-transitory computer storage having stored thereon instructions that, when executed by one or more hardware processors, cause the one or more hardware processors to:
obtain, from a firmware component included in a mobile computing device, a private persona key based on persona information associated with a user of the mobile computing device;
obtain, from the firmware component, a public device key associated with hardware included in the mobile computing device;
receive, by a certificate authority included in the mobile computing device from the firmware component, a persona-device identifier associated with a pairing of the user and the mobile computing device, wherein the persona-device identifier is generated based, at least in part, on the private persona key and the public device key; and
cause, by the certificate authority, generation of a digital certificate certifying that the mobile computing device is under control of the user.

16. The non-transitory computer storage of claim 15, wherein the certificate authority is implemented as hardware on the mobile computing device.

17. The non-transitory computer storage of claim 15, wherein the certificate authority is implemented as hardware on the mobile computing device.

18. The non-transitory computing storage of claim 15, wherein the digital certificate includes an expiration time or condition.

19. The non-transitory computer storage of claim 15, wherein the instructions further cause the one or more hardware processors to transmit the digital certificate to another computing device.

20. The non-transitory computer storage of claim 15, wherein the certificate authority is implemented as hardware on the mobile computing device, and wherein the certificate authority is implemented as hardware on the mobile computing device.

* * * * *